(12) United States Patent
Hauck et al.

(10) Patent No.: US 6,357,926 B1
(45) Date of Patent: Mar. 19, 2002

(54) ROLLING-BEARING ROLLER FIXING DEVICE AND ROLLING-BEARING ROLLER INCLUDING SUCH A DEVICE

(75) Inventors: Helmut Hauck, Euerbach; Robert Stolz, Schweinfurt; Bettina Stoyke, Schonungen, all of (DE); Dieter Ploessl, Tours (FR)

(73) Assignee: SKF France, Clamart (FR)

( * ) Notice: Subject to any disclaimer, the term of this patent is extended or adjusted under 35 U.S.C. 154(b) by 0 days.

(21) Appl. No.: 09/592,666

(22) Filed: Jun. 13, 2000

(30) Foreign Application Priority Data

Jun. 14, 1999 (FR) .............................. 99 07494

(51) Int. Cl.⁷ ............................................. F16C 13/00
(52) U.S. Cl. ..................................................... 384/546
(58) Field of Search ................... 384/484, 485, 384/488, 537, 542, 543, 544, 546, 547, 585; 411/188, 187, 531, 533, 542, 371.1, 903; 474/101, 112, 133, 135, 138, 903

(56) References Cited

U.S. PATENT DOCUMENTS

| | | | | |
|---|---|---|---|---|
| 3,746,413 A | * | 7/1973 | Nishikawa ................... | 384/542 |
| 4,339,158 A | | 7/1982 | Greener et al. | |
| 4,602,875 A | * | 7/1986 | Doerr et al. ................. | 384/488 |
| 4,842,463 A | * | 6/1989 | Landt ......................... | 411/188 |
| 5,302,066 A | * | 4/1994 | Bieschke et al. ............ | 411/181 |
| 5,334,109 A | | 8/1994 | Izutsu et al. ................. | 474/135 |
| 5,964,674 A | * | 10/1999 | Serkh et al. ................. | 474/109 |
| 5,993,343 A | * | 11/1999 | Rocca et al. ................. | 474/135 |
| 6,241,257 B1 | * | 6/2001 | Hauck et al. ............ | 384/489 X |

FOREIGN PATENT DOCUMENTS

| | | |
|---|---|---|
| DE | 15 75 490 | 1/1970 |
| DE | 4242293 A1 | 6/1993 |
| DE | 42 35 288 | 4/1994 |
| DE | 297 20 776 | 1/1998 |
| EP | 0 856 684 | 8/1998 |
| GB | 2 118 675 | 11/1983 |

* cited by examiner

Primary Examiner—Thomas R. Hannon
(74) Attorney, Agent, or Firm—Smith, Gambrell & Russell LLP

(57) ABSTRACT

The fixing device is intended for a roller of the type comprising a pulley mounted on a rolling-bearing device comprising a row of rolling elements arranged between a ball race provided on an outer ring integral with the pulley and a ball race provided on an inner ring. The device comprises a screw comprising a cylindrical rod and, at one end of the cylindrical rod, a head provided with a rotary-drive. The device comprises a sleeve arranged on the screw, said sleeve comprising a gripping surface for fixing on the inner ring of the rolling bearing and leaktight seal interacting with a turning part of the roller.

27 Claims, 4 Drawing Sheets

ROLLING-BEARING ROLLER FIXING DEVICE AND ROLLING-BEARING ROLLER INCLUDING SUCH A DEVICE

FIELD OF THE INVERNTION

The present invention relates to the field of rolling-bearing rollers and, in particular, rolling-bearing belt-tensioning rollers, for example rollers used in the engines of motor vehicles in order to ensure adequate tensioning of a drive belt for an accessory of the engine, such as the water pump, the alternator, etc.

PRIOR ART

In a manner known per se, such rollers comprise a pulley or a rim mounted on the turning outer ring of a rolling bearing. The pulley is intended to come to bear radially against a belt. The nonturning inner ring of the rolling bearing is mounted on a support which makes it possible, by means of an appropriate system, radially to displace the rolling bearing and the pulley with regard to the belt and in this way to adjust the tension of the belt. The nonturning inner ring of the rolling bearing is fixed on the roller support by means of a screw. It is possible to use this screw to fix a leaktight end plate onto the device, providing supplementary protection of the rolling bearing against the ingress of undesirable pollutants originating from the outside.

Such devices are described in the documents DE-A-42 42 293 and DE-U 297 20 776.

Although such systems function correctly, they nevertheless have certain drawbacks.

The rolling-bearing roller, the fixing screw and the leaktight end plate consist of three distinct pieces which in the majority of cases cannot be preassembled, manipulated and transported without the risk of dismantling.

Moreover, when the rolling bearing is fixed onto its support, using the pinching of the end plate between the screw head and the face of the rolling bearing, it is difficult, for reasons of mechanical strength, to use nonmetallic end plates, which has a detrimental effect on the cost and weight.

In the case of document DE-U 297 20 776, the sheet-metal leaktight end plate is slipped into the bore of the inner ring of the rolling bearing, which requires a degree of precision in the manufacturing tolerances of the end plate at the location of the sleeving cylindrical bearing surface, resulting in an increase in manufacturing costs.

Tight steel/steel sleeving inevitably gives rise to geometrical variations in the inner ring of the rolling bearing, which are reflected in internal reductions in play which may be relatively difficult to control.

SUMMARY OF THE INVENTION

The invention proposes to solve all these problems.

The subject of the invention is an economical fixing device incorporating a leaktight means which does not risk becoming dismantled before final fixing and which does not affect the geometry of the inner ring of the rolling bearing.

According to the invention, the fixing device is intended for a roller of the type comprising a pulley mounted on a rolling-bearing device comprising a row of rolling elements arranged between a ball race provided on an outer ring integral with the pulley and a ball race provided on an inner ring. Said device comprises a screw comprising a cylindrical rod and, at one end of the cylindrical rod, a head provided with rotary-drive means. The device comprises a sleeve integral with the screw, said sleeve comprising means for fixing on the inner ring of the rolling bearing and leaktight means interacting with a turning part of the roller. The radial face of the screw head located on the cylindrical-rod side is provided with at least one passage allowing continuity of material between the fixing means and the leaktight means.

Advantageously, the sleeve is produced from synthetic material overmolded onto the screw.

In one embodiment of the invention, the screw comprises means for anchoring the sleeve.

Advantageously, the sleeve comprises an annular portion surrounding the cylindrical part of the screw over a part of its length.

In one embodiment of the invention, the annular portion of the sleeve is provided with an outer cylindrical surface capable of gripping in the bore of the nonturning ring of the rolling bearing. Said outer cylindrical surface may be provided with axial grooves.

Advantageously, the sleeve comprises a substantially radial portion, the inner edge of which is in contact with the screw head and the outer edge of which interacts with the turning part of the roller in order to form a seal, the inner edge of said substantially radial portion being cut into radii arranged in the corresponding grooves of the screw head. Said screw head may be capable of coming into contact with the inner ring of the rolling bearing.

In one embodiment of the invention, the screw comes into contact with the face of the rolling bearing via coplanar support surfaces which between them define radial grooves filled with plastics material in order to form radii, the thickness of the radii in the axial direction being equal to or less than the axial depth of said grooves.

In one embodiment of the invention, the sleeve is extended, axially away from the screw head, by radially elastic tongues equipped with hooks at their end, the hooks being capable of interacting with the radial face of the inner ring opposite the face in contact with the screw head.

A further subject of the invention is a fixing screw intended for a roller of the type comprising a pulley mounted on a rolling-bearing device comprising a row of rolling elements arranged between a ball race provided on an outer ring integral with the pulley and an inner ball race provided on an inner ring. The screw comprises a cylindrical part in the form of a rod which is at least partly threaded and, at one end of the cylindrical part, a head provided with rotary-drive means and a substantially radial support face arranged on the cylindrical-part side. The substantially radial support face of the head comprises at least one surface capable of coming into contact with a lateral face of the inner ring and at least one radial groove extending between the cylindrical part and the periphery of the contact surface.

In one embodiment, the screw comprises a plurality of axial protuberances facing the free end of the cylindrical part, said protuberances having a radial support surface, the axial protuberances being unconnected in such a manner that radial grooves are formed between them.

A further subject of the invention is a rolling-bearing roller comprising a fixing device.

Thus, the screw has the form of a partially or totally threaded cylindrical rod and of a head which is, for example, hexagonal, the radial face of the head located on the rod side being provided with axial protuberances which are separated from one another in the circumferential direction by spaces, the axial protuberances having radial surfaces which are intended to enter into contact with a lateral face of the inner ring of the rolling bearing and the spaces forming passages allowing continuity of material between the sealing part of the sleeve extending radially beyond the screw head towards the outside and the annular part of the sleeve located in the bore of the inner ring. Said radial surfaces of the axial protuberances allow direct contact with the inner ring. The sleeve may be formed by overmolding of plastics material and is secured with the screw in the axial direction owing to the thread of the screw or, optionally, of suitable reliefs formed on its rod and in rotation via the spaces and the axial protuberances mentioned above. The screw and its plastics sleeve thus form a particularly lightweight assembly which cannot come apart and is economical to produce. The tightening of the screw on the inner ring does not affect the sleeve, which has the same shape before and after tightening.

BRIEF DESCRIPTION OF THE DRAWINGS

The present invention will be better understood upon studying the detailed description of a number of embodiments taken by way of nonlimiting examples and illustrated by the appended drawings, in which.

DESCRIPTION OF THE PREFERRED EMBODIMENT

Figure 1:
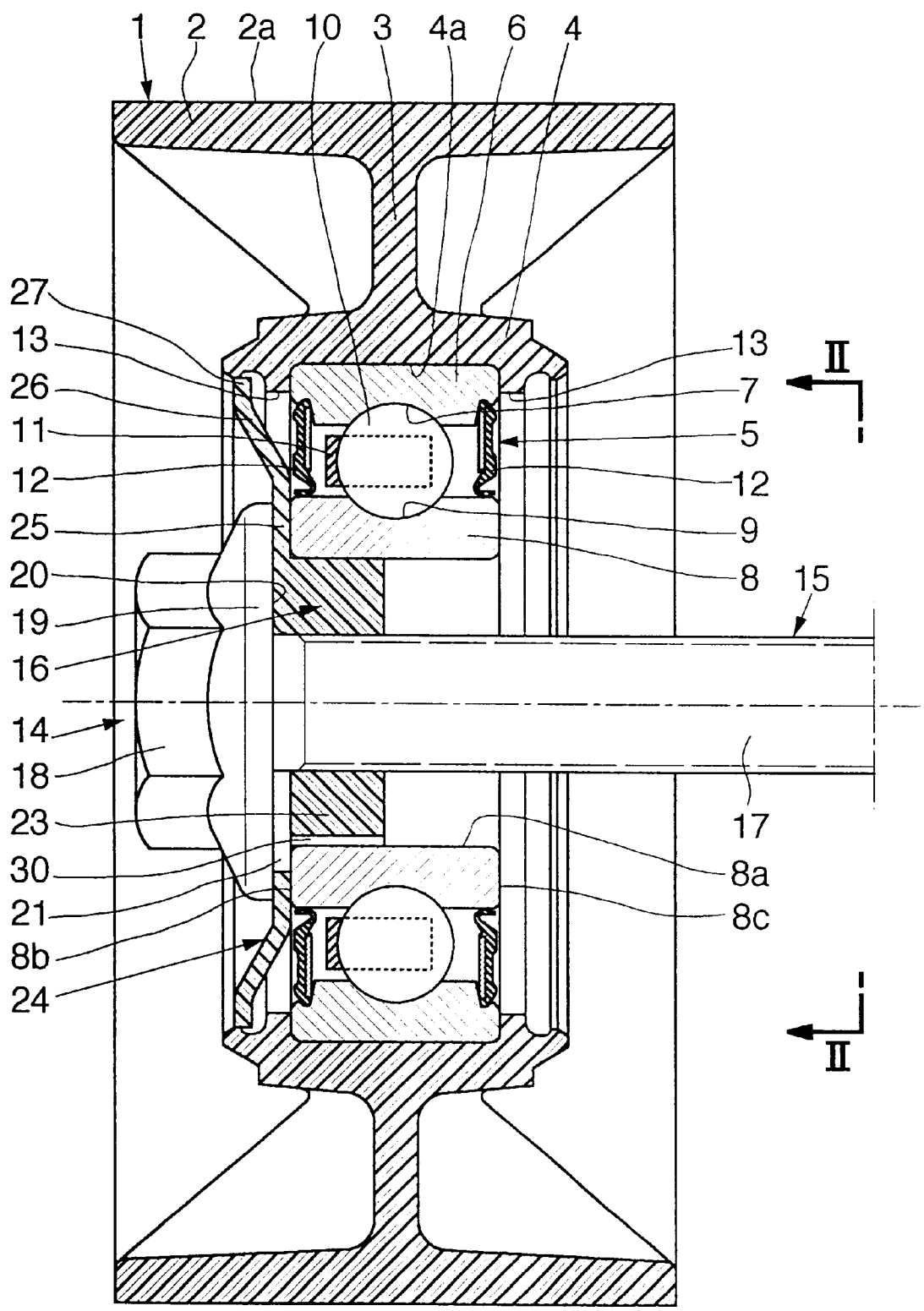
FIG. 1 is an axial sectional view of a rolling-bearing roller according to the invention.
Figure 2:
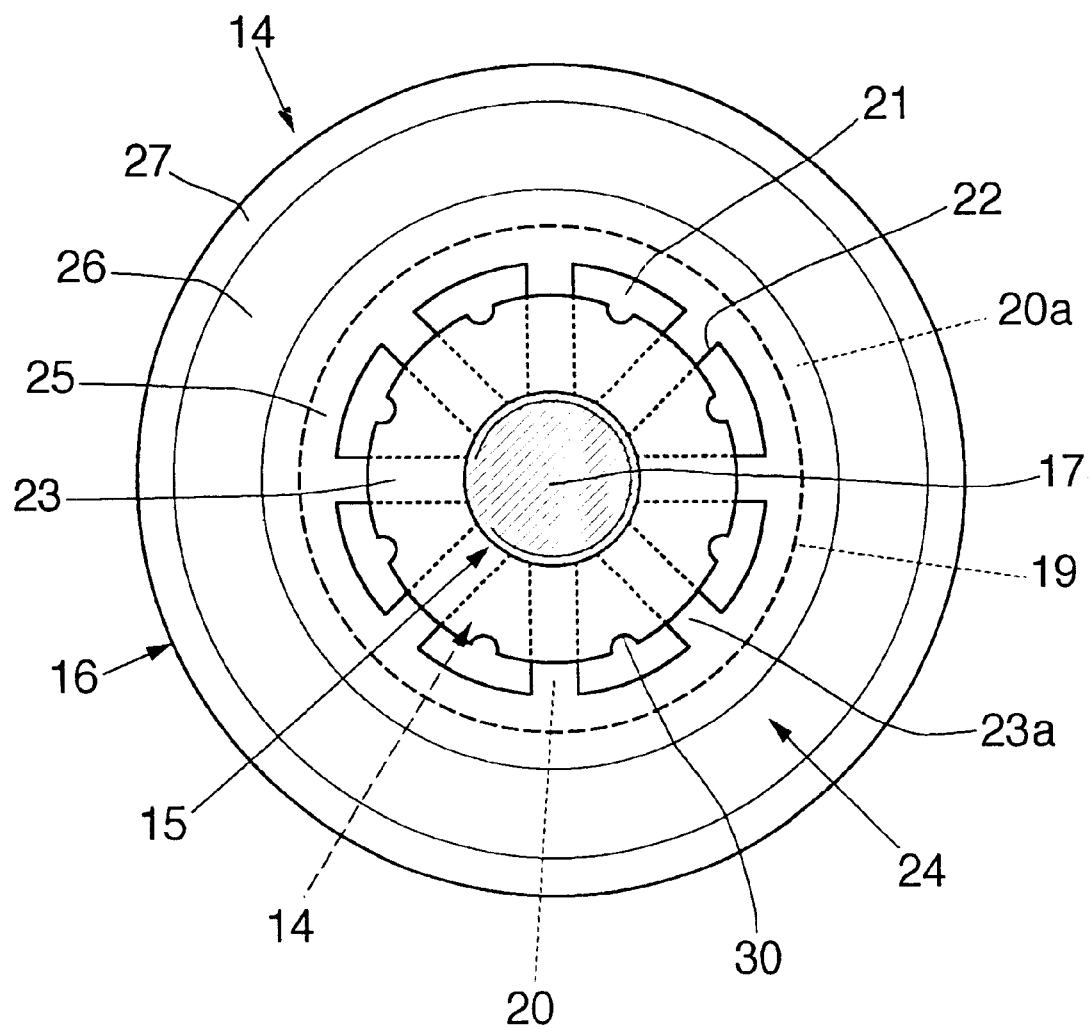
FIG. 2 is a sectional view along II—II in FIG. 1.

As may be seen in FIGS. 1 and 2, the rolling-bearing roller comprises a pulley 1 provided with an outer cylindrical part 2, the outer surface 2a of which is provided in order to enter into contact with a belt, with a radial part 3 facing inward from the cylindrical part 2, and with an inner cylindrical part 4 extending from the inner end of the radial part 3. The pulley 1 is of annular shape and receives a rolling bearing 5 in the bore 4a of the inner cylindrical part 4.

The rolling bearing 5 comprises an outer ring 6 provided with an inner ball race 7, an inner ring provided with an outer ball race 9, a row of rolling elements 10, for example balls, arranged between the all races 7 and 9, and a cage 11 produced from synthetic material and maintaining a regular circumferential spacing between the rolling elements 10. Leaktight members 12 are arranged on either side of the row of rolling elements 10 and are integral with the outer ring 6 while coming into frictional contact with the inner ring 8. The inner ring 8 has a bore 8a and radial lateral faces 8b and 8c. The pulley 1, made from synthetic material, may be overmolded onto the outer ring 6, shoulders 13 originating from the inner cylindrical part 4 facing radially inward axially securing the pulley 1 on the outer ring 6 while being in contact with lateral faces 8b and 8c of the latter.

A fixing device referenced 14 overall comprises a screw 15 and a sleeve 16.

Figure 3:
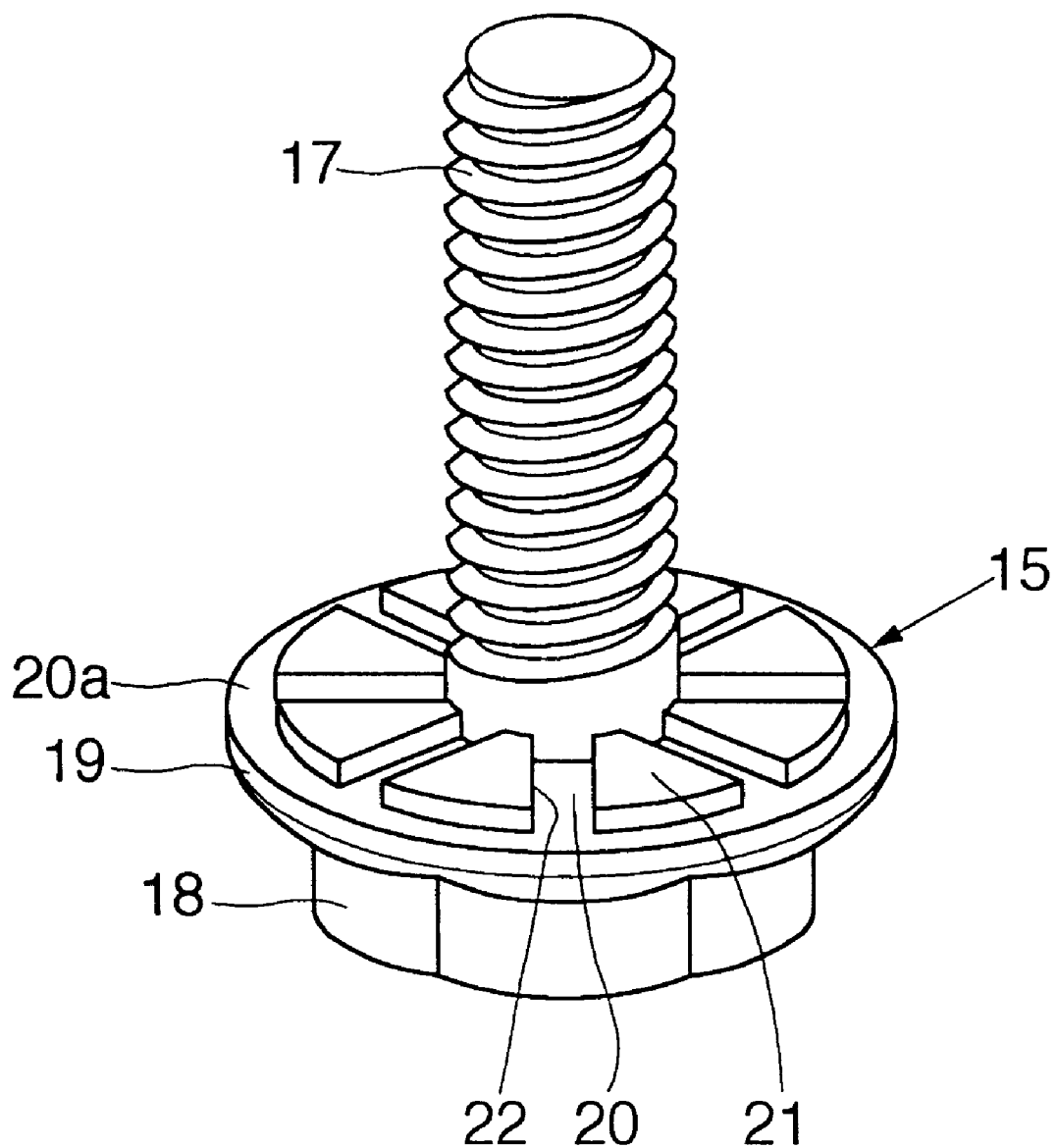
FIG. 3 is a perspective view of the fixing screw according to the invention.

The screw 15 comprises a cylindrical part 17 of revolution, the outer surface of which is in this case entirely threaded. However, by way of variation, the cylindrical part 17 may be partially threaded and partially smooth. The screw 15 also comprises a head 18 of hexagonal type fixed to one end of the cylindrical part 17. A skirt 19 extends the head 18, widening it. The skirt 19 is arranged axially on the cylindrical part 17 side and has a radial face 20 on the cylindrical part 17 side. The radial part 20 is provided with eight axial protuberances 21 which are better seen in FIGS. 2 and 3, and which are circumferentially regularly distributed and in the form of a parallelogram extending from the cylindrical part 17 outward.

Naturally, by way of variation, a different number of protuberances 21 could be provided. The protuberances 21 do not extend as far as the outer edge of the face 20, but leave a radial annular portion 20a on said edge. The axial protuberances 21 all have the same thickness and end axially in coplanar radial surfaces 21a. These coplanar surfaces 21a are therefore inscribed in a plane which is parallel and axially slightly offset with regard to the plane of the radial face 20. The axial protuberances 21 leave between them passages in the form of eight grooves 22, the bottom of which forms a part of the radial face 20 and which extend between the cylindrical part 17 and the radial annular part 20a.

The sleeve 16 is produced from synthetic material, preferably overmolded onto the screw 15. The sleeve 16 comprises an annular part 23 arranged between the bore 8a of the inner ring 8 and the outer surface of the cylindrical part 17 forming the stem of the screw. In this case, the annular part 23 is seen interacting with the thread of the cylindrical part 17. The sleeve 16 is in contact, on the head 18 of the screw 15 side, with the protuberances 21 and the grooves 22. The correspondence of shape between the sleeve 16 and the screw 15 is ensured by the overmolding of the plastics onto the screw. The annular part 23 of the sleeve 16 therefore projects into the grooves 22, which provides a secure link in rotation with regard to the screw 15, while the correspondence of shape with the thread of the cylindrical part 17 of the screw 15 ensures a secure link in the axial direction.

The sleeve 16 also comprises a leaktight part 24 arranged on a side of the rolling bearing 5, while being in contact with the head 18 of the screw 15. The leaktight part 24 comprises a first radial portion 25 arranged between the skirt 19 and the radial face 8b of the inner ring 8, an oblique portion 26 extending radially outward and axially away from the rolling bearing 5 from the outer edge of the first radial portion 25 and a second radial portion 27 originating from the outer edge of the-oblique portion 26 and the periphery of which interacts with the inner cylindrical part 4 of the pulley 1 by means of friction or close passage, in this way improving the seal of the rolling bearing 5. On this side, the leaktightness of the rolling bearing 5 is therefore ensured both by the leaktight part 24 of the sleeve 16 and by the seal 12 integral with the outer ring 6. The first radial portion 25 is in contact with the annular part 20a of the radial face 20 and extends as far as into the grooves 22 formed between the protuberances 21 of the skirt 19. The annular part 23 of the sleeve is connected to the leaktight part 24 by radii 23a, the dimensions of which are identical to those of the grooves 22.

In this way, when the roller is assembled, the fixing device incorporates the fixing means formed by the actual screw, the means for centering the inner ring of the rolling bearing with regard to the screw, formed by the annular part 23, and the supplementary leaktight means formed by the leaktight part 24 of the sleeve 16. This fixing device presents no risk of dismantling or of the loss of an element owing to the securing of the sleeve 16 and the screw 15.

Figure 4:
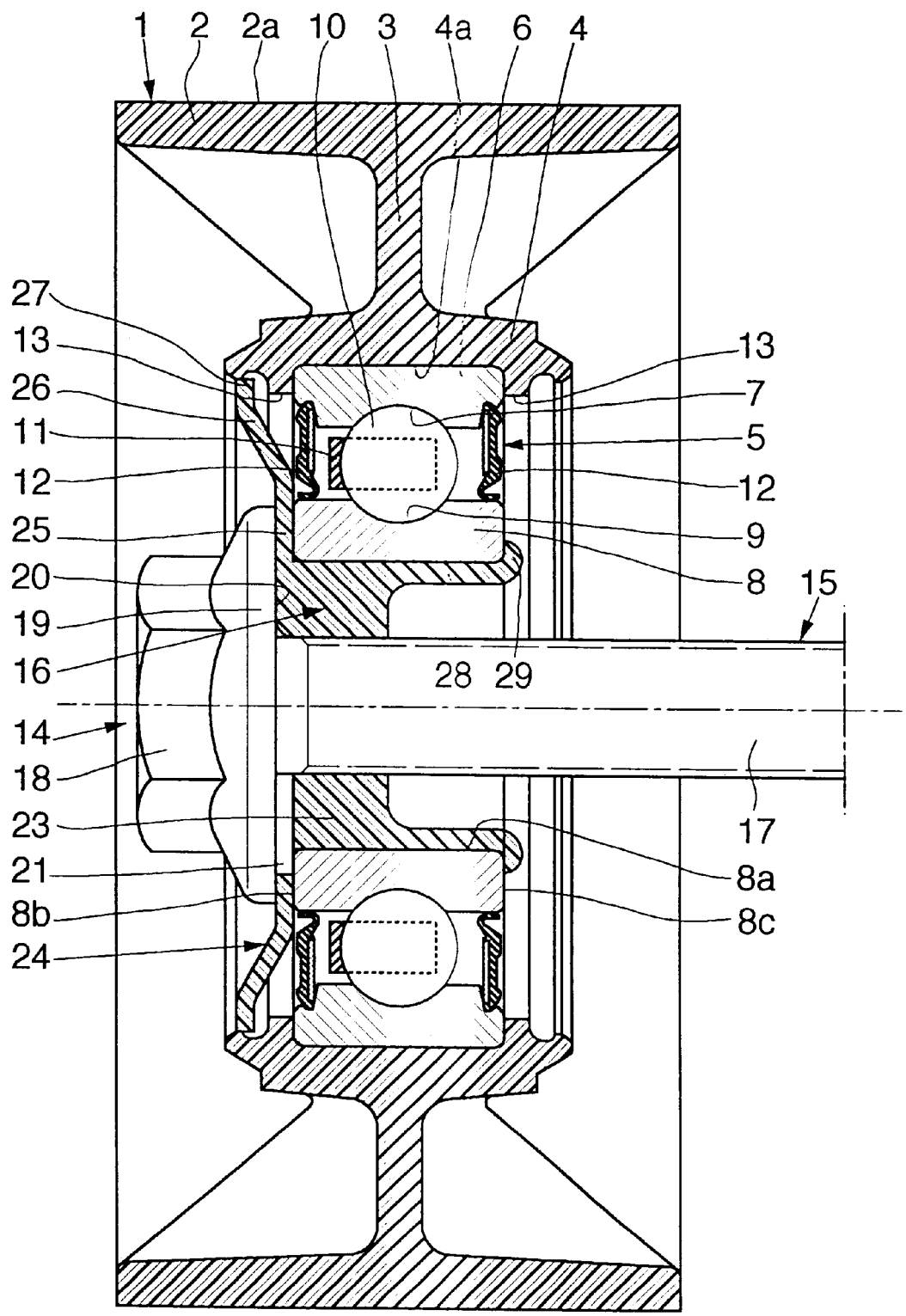
FIG. 4 is a half-view in axial section of a variant of the embodiment of FIG. 1.

It will be observed in FIG. 1 that the annular part 23 of the sleeve 16 does not extend axially beyond the mid-plane passing through the center of the rolling elements 10. Conversely, in the variant illustrated in FIG. 4, the sleeve 16 is provided with a plurality of elastic tongues 28 extending from the annular part 23 in the axial direction away from the head 18 of the screw 15 and in contact with the bore 8a of the inner ring 8.

Each tongue 28 ends in a hook 29 which extends radially outward while being in contact with the radial lateral face 8c of the inner ring 8. These tongues 28 equipped with their hook 29 in this way ensure the securing of the fixing device 14 onto the pulley 1 equipped with the rolling bearing 5. The roller assembly may therefore be manipulated before final fixing onto its support without the risk of pieces being lost.

The annular part 20a of the radial face 20 makes it possible slightly to pinch the first radial portion 25 of the leaktight part 24 between the radial face 20 of the screw 15 and the lateral face 8b of the inner ring 8, which increases the rigidity of said leaktight part 24 while the screw 15 still bears on the lateral face 8b by means of the radial surfaces 21b of the protuberances 21. In other words, the grooves 22 in which the plastics material forming the sleeve 16 is arranged make it possible to ensure continuity of material between the annular part 23 and the leaktight part 24, but without affecting the locking of the inner ring 8 by the screw 15 when the screw 15 is tightened in order to lock the inner ring 8 onto its support, tightening of the screw 15 onto the inner ring 8 taking place directly by means of metal/metal contact between the protuberances 21 and the lateral face 8b of the inner ring 8 of the rolling bearing.

The screw 15 may be mass produced economically using press drop forging, and the overmolding of plastics material intended to form the sleeve is achieved by injection molding and takes place in such a manner that the plastics material fills the radial grooves 22 located between the axial protuberances 21 of the screw 15 while leaving bare the support surfaces 21a of the protuberances 21 of the screw 15 facing the radial face 8b of the inner ring 8 of the rolling bearing 5 and against which they are intended to bear.

Overmolding also coats a certain length of the threaded part of the screw in the vicinity of the screw head. The plastics sleeve formed from the annular part and from the leaktight part is thus completely secured to the fixing screw radially, axially and angularly by virtue of the anchoring means consisting of the radial grooves located between the axial protuberances on the one hand and the thread of the screw stem on the other. The screw and its sleeve therefore constitute an undismantlable assembly which is particularly lightweight and economical to produce. The screw and its sleeve may be raised in the bore of the rolling bearing by simple sleeving and thus constitute with the roller an assembly which is easy to transport without the risk of the pieces being dismantled. The plastics material of the sleeve makes it possible to achieve an effective secure link between the rolling bearing and the screw by simple sleeving, without thereby risking deforming the ring of the rolling bearing as is often the case when using a metal fixing sleeve.

Axial grooves 30 may advantageously be provided on the periphery of the cylindrical bearing surface of the sleeve in order to facilitate its sleeving in the bore of the inner ring of the rolling bearing. Strictly speaking, the axial grooves 30 should not be visible in FIG. 1. However, for better understanding, an axial groove 30 has been shown in the lower half of FIG. 1, as if the sectional plane had been offset by a few degrees of an angle between the lower half and the upper half of FIG. 1.

The screw is completely centered with regard to said inner ring, which makes subsequent assembly of the roller on its support (not shown) easier, by means of said inner ring. The securing of the sleeve and the rolling bearing by gripping in the bore of the inner ring of the rolling bearing may be replaced by the hooking tongues of the embodiment of FIG. 4. The cylindrical bearing surface of the sleeve then serves only for centering the pieces.

When fitting the roller on its support, when the fixing screw is tightened in order to secure the nonturning inner ring onto the support, the support surfaces of the screw grip against the face of the rolling bearing without the plastics material of the sleeve risking being damaged by said gripping.

By virtue of the invention, it is possible economically to obtain an assembly including a rolling-bearing roller equipped with its fixing device and the complementary leaktight system. Such an assembly is formed by means of the assembly of only two subassemblies: roller and fixing device. The number of pieces to be managed and to be stocked is therefore very small. Assembly of the fixing device onto the roller is extremely simple and it can easily be automated. The assembly thus constituted is lightweight and can be transported and manipulated up to the point of final mounting onto the support in complete safety, without the risk of pieces being lost.

What is claimed is:

1. A roller-fixing device for use with a rolling-bearing device having an outer ring integral with a pulley and an inner ring, said roller-fixing device comprising a screw comprising a cylindrical rod and, at one end of the cylindrical rod, a head provided with a rotary-drive means, and a sleeve arranged on the screw, said sleeve comprising means for fixing said sleeve on the inner ring of the rolling bearing and leaktight means for interacting with a turning part of the pulley when said roller-fixing device is in use, and a radial face of the screw head, located on the cylindrical rod side, is provided with at least one passage allowing continuity of material between the fixing means and the leaktight means.

2. The device as claimed in claim 1, wherein the sleeve is produced from synthetic material overmolded onto the screw.

3. The device as claimed in claim 1, wherein the screw comprises means for anchoring the sleeve.

4. The device as claimed in claim 1, wherein the sleeve comprises an annular portion surrounding the cylindrical part of the screw over a part of its length.

5. The device as claimed in claim 4, wherein the annular portion of the sleeve is provided with an outer cylindrical surface capable of gripping in the bore of the nonturning ring of the rolling bearing.

6. The device as claimed in claim 5, wherein said outer cylindrical surface is provided with axial grooves.

7. The device as claimed in claim 1, wherein the sleeve comprises a substantially radial portion, the inner edge of which is in contact with the screw head and the outer edge of which interacts with the turning part of the roller in order to form a seal, the inner edge of said substantially radial portion being cut into radii arranged in the corresponding grooves of the screw head.

8. The device as claimed in claim 1, wherein said screw head is capable of coming into contact with the inner ring of the rolling bearing.

9. The device as claimed in claim 8, wherein the screw comes into contact with the face of the rolling bearing via coplanar support surfaces which between them define radial grooves filled with plastics material in order to form radii, the thickness of the radii in the axial direction being equal to or less than the axial depth of said grooves.

10. The device as claimed in claim 1, wherein the sleeve is extended, axially away from the screw head, by radially elastic tongues equipped with hooks at their end, the hooks being capable of interacting with a radial face of the inner ring opposite a face in contact with the screw head.

11. The device as claimed in claim 1 wherein the radial face of said screw head comprises a plurality of coplanar support surfaces which between them define radial grooves filled with plastics material of said sleeve in order to form radii, the thickness of the radii in the axial direction being equal to or less than the axial depth of said grooves.

12. A fixing screw for a roller-fixing device, said screw comprising a cylindrical rod and, at one end of the cylindrical rod, a head provided with a rotary drive means, wherein the head comprises a substantially radial face arranged on the cylindrical rod side and comprising at least one surface positioned for contact with a lateral face of an inner ring of a rolling-bearing device when the fixing screw is in use and at least one radial groove extending between the cylindrical rod and the periphery of the contact surface.

13. The fixing screw of claim 12, wherein said screw comprises means for anchoring an inner ring contacting sleeve of the roller-fixing device.

14. The fixing screw of claim 12, comprising a plurality of radial grooves that are circumferentially spaced apart.

15. The fixing screw of claim 12, further comprising a skirt extending from said head, and said grooves are defined by a plurality of axial protruberences which extend off said skirt.

16. The fixing screw of claim 15, wherein said skirt includes an annular part which surrounds radial outer surfaces of said protruberences and partially defines said radial face.

17. The fixing screw of claim 15, wherein said axial protruberences extend radially inward into contact with said cylindrical rod.

18. A rolling-bearing roller apparatus, comprising: a rolling-bearing device having an outer ring and an inner ring positioned radially inward of said outer ring, a roller supported by said outer ring; a roller fixing device having a screw comprising a cylindrical rod and, at one end of the cylindrical rod, a head provided with a rotary-drive means, and a sleeve arranged on the screw, said sleeve comprising means for fixing the sleeve on said inner ring and leaktight means interacting with a turning part of the rolling-bearing roller apparatus, a radial face of the screw head located on the cylindrical rod side being provided with at least one passage allowing continuity of material between the fixing means and the leaktight means.

19. The apparatus as claimed in claim 12, wherein the screw comprises means for anchoring the sleeve.

20. The apparatus as claimed in claim 12, wherein the sleeve comprises an annular portion surrounding the cylindrical rod of the screw over a part of its length.

21. The apparatus as claimed in claim 12, wherein said sleeve is provided with an outer cylindrical surface capable of gripping in the bore of a nonturning ring of the rolling bearing device.

22. The apparatus as claimed in claim 21, wherein said outer cylindrical surface is provided with axial grooves.

23. The apparatus as claimed in claim 12, wherein said sleeve comprises a substantially radial portion, an inner edge of which is in contact with the screw head and on outer edge of which interacts with a turning part of the roller in order to form a seal, the inner edge of said substantially radial portion being cut into radii arranged in the corresponding grooves of the screw head.

24. The apparatus as claimed in claim 12, wherein said screw head is in contact with the inner ring of the rolling bearing device.

25. The apparatus as claimed in claim 24, wherein the screw comes into contact with the face of the rolling bearing via coplanar support surfaces which between them define radial grooves filled with plastics material in order to form radii, the thickness of the radii in the axial direction being equal to or less than the axial depth of said grooves.

26. The apparatus as claimed in claim 12, wherein said sleeve includes elastic tongues equipped with hooks at their end, the hooks being in contact with a radial face of said inner ring opposite the face in contact with said screw head.

27. The apparatus as recited in claim 12, further comprising a set of roller elements positioned between and in contact with said inner and outer rings.

* * * * *